US009004581B2

(12) United States Patent
Tokuda

(10) Patent No.: US 9,004,581 B2
(45) Date of Patent: Apr. 14, 2015

(54) PIPE FIXING PART STRUCTURE FOR VEHICLE

(71) Applicant: Suzuki Motor Corporation, Shizuoka-ken (JP)

(72) Inventor: Keisuke Tokuda, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 80 days.

(21) Appl. No.: 13/851,220

(22) Filed: Mar. 27, 2013

(65) Prior Publication Data

US 2013/0300156 A1    Nov. 14, 2013

(30) Foreign Application Priority Data

May 14, 2012   (JP) .................................. 2012-111001

(51) Int. Cl.
*B62D 25/20* (2006.01)
*B60R 13/08* (2006.01)

(52) U.S. Cl.
CPC ............ *B62D 25/20* (2013.01); *B60R 13/0861* (2013.01)

(58) Field of Classification Search
CPC .... B62D 25/20; B62D 25/2072; B62D 25/24; B62D 21/17; B60R 16/00

USPC ................... 296/193.07, 208, 38, 39.1, 1.06
See application file for complete search history.

(56) References Cited

U.S. PATENT DOCUMENTS

| | | | | |
|---|---|---|---|---|
| 3,934,802 A | * | 1/1976 | Jennings | 248/71 |
| 5,002,243 A | * | 3/1991 | Kraus et al. | 248/68.1 |
| 5,172,877 A | * | 12/1992 | Hattori et al. | 248/68.1 |
| 2006/0086016 A1 | * | 4/2006 | Cornell et al. | 40/209 |

FOREIGN PATENT DOCUMENTS

| | | |
|---|---|---|
| JP | 62-132849 U | 8/1987 |
| JP | 2009-241792 A | 10/2009 |

* cited by examiner

*Primary Examiner* — Jason S Morrow
*Assistant Examiner* — E Turner Hicks
(74) *Attorney, Agent, or Firm* — Lerner, David, Littenberg, Krumholz & Mentlik, LLP

(57) ABSTRACT

As a fixing part structure of pipes for a vehicle, in which part of the bottom surface of a floor panel is covered by an under cover and the pipes are arranged in the front-back direction of the vehicle between the under cover and the floor panel, adopted is a configuration in which: a clamp that holds the pipes is fixed to the bottom surface of the floor panel; a cutout is formed in a vertical wall at least a front end edge of the under cover; and the clamp is placed in the cutout. Further, the cutout of the under cover is formed into a shape along the outer shape of the clamp, and a flange is formed along the outer surface of the clamp, in the periphery of the cutout.

8 Claims, 3 Drawing Sheets

FRONT ←

FRONT ←

FRONT ←

US 9,004,581 B2

PIPE FIXING PART STRUCTURE FOR VEHICLE

CROSS-REFERENCE TO RELATED APPLICATION

The present application claims priority from Japanese Patent Application No. 2012-111001 filed May 14, 2012, the disclosure of which is hereby incorporated herein by reference.

BACKGROUND OF THE INVENTION

The present invention relates to a pipe fixing part structure for a vehicle, in which pipes are arranged in the front-back direction of a vehicle between a floor panel and an under cover that covers part of the bottom surface of the floor panel.

Various pipes such as a brake pipe and a fuel pipe are provided in the front-back direction of a vehicle on the bottom surface of a floor panel of a vehicle. In order to protect these pipes from flying stones and the like, the pipes are covered from below by a protector (see, for example, Japanese Utility Model Laid-Open No. 62-132849).

In order to enhance aerodynamic performance during running of a vehicle, part of the bottom surface of a floor panel is covered by an under cover. A configuration of arranging pipes through the space between the floor panel and the under cover is adopted for such a vehicle. Japanese Patent Laid-Open 2009-241792 proposes the following configuration in order to protect the pipes even in the case where the under cover comes into strong contact with a road surface, stones on the road surface, or the like and thus deforms significantly. In the proposed configuration, a guide groove is formed by a protruding part having a height larger than the pipe diameters, on the upper surface of the under cover, and the pipes are arranged through the guide groove.

Here, a structure example of a vehicle bottom surface for which the configuration of arranging pipes through the space between the floor panel and the under cover is adopted is illustrated in FIG. 4 to FIG. 6.

FIG. 4 is a partial bottom surface view of a vehicle. FIG. 5 is a partial perspective view of an opening part of an under cover on a vehicle bottom surface. FIG. 6 is a cross-sectional view taken along a line B-B in FIG. 5. A plurality of (four in the example illustrated in the drawings) pipes 102, 103, 104, and 105 are provided along the front-back direction of the vehicle (the left-right direction in FIG. 4 and FIG. 6) on the bottom surface of a floor panel 101 of the vehicle. The pipes 102 to 105 are fixed to the bottom surface of the floor panel 101 by a clamp 107.

Further, part of the bottom surface of the floor panel 101 is covered by an under cover 106. The pipes 102 to 105 are arranged through the space between the under cover 106 and the floor panel 101. Here, as illustrated in FIG. 5, a vertical wall 106A is vertically provided so as to extend upward from the front end edge of the under cover 106 to the bottom surface of the floor panel 101. A rectangular opening part 106a that allows the pipes 102 to 105 to pass therethrough is formed in the vertical wall 106A.

BRIEF SUMMARY OF THE INVENTION

In such a conventional configuration as illustrated in FIG. 4 to FIG. 6, it is desirable to minimize the size of the opening part 106a of the under cover 106 while avoiding contact between the periphery of the opening part 106a and the pipes 102 to 105. In reality, however, it is difficult to secure the positioning accuracy of the pipes 102 to 105 and the under cover 106, and the opening part 106a of the under cover 106 cannot be made sufficiently small in order to avoid interference and abutment.

If the opening part 106a of the under cover 106 is large, there occur such problems that foreign substances such as small stones invade the under cover 106 from the opening part 106a, a strange sound occurs, and the aerodynamic performance of the vehicle drops.

The present invention, which has been made in view of the said problems, has an object to provide a pipe fixing part structure for a vehicle that can prevent the invasion of foreign substances into an under cover and the occurrence of a strange sound and can protect pipes without using a protective member.

In order to achieve the said object, an invention according to a first aspect has, as a pipe fixing part structure for a vehicle, in which part of a bottom surface of a floor panel is covered by an under cover and a pipe is placed in a front-back direction of a vehicle between the under cover and the floor panel, a configuration in which: a clamp that holds the pipe is fixed to a bottom surface of the floor panel; a cutout is formed at at least a front end edge of the under cover; and the clamp is placed in the cutout.

An invention according to a second aspect has, in the invention according to the first aspect, the clamp is placed across the cutout of the under cover so as to extend on both front and back sides of the cutout of the under cover.

An invention according to a third aspect has, in the invention according to the first or second aspects, the cutout of the under cover is formed into a shape along an outer shape of the clamp, and a flange is formed along an outer surface of the clamp in a periphery of the cutout.

An invention according to a fourth aspect has, in the invention according to any of the first to third aspects, a fitting groove is formed along the front-back direction of the vehicle on an upper surface of the clamp, and the pipe is fitted into the fitting groove.

According to the invention according to the first aspect, the clamp that holds the pipe is placed in the cutout formed at least the front end edge of the under cover. Hence, the clamp prevents the pipe from coming into contact with the periphery of the cutout of the under cover, and, without the use of a protective member such as a protector, the pipe can be protected and prevented from being damaged. Further, the cutout of the under cover is closed by the clamp. Hence, the invasion of foreign substances into the under cover and the occurrence of a strange sound can be prevented, and the aerodynamic performance of the vehicle can be enhanced.

According to the invention according to the second aspect, the clamp is placed across the cutout of the under cover so as to extend on both the front and back sides of the cutout of the under cover. Hence, the clamp reliably prevents the pipe from coming into contact with the periphery of the cutout of the under cover, and the pipe can be effectively protected.

According to the invention according to the third aspect, the cutout of the under cover is formed into the shape along the outer shape of the clamp, and the flange is formed along the outer surface of the clamp, in the periphery of the cutout. Hence, a gap between the cutout of the under cover and the clamp is minimized, the invasion of foreign substances into the under cover and the occurrence of a strange sound can be reliably prevented, and the aerodynamic performance of the vehicle can be further enhanced. Further, the clamp is in surface contact with the flange formed in the periphery of the cutout of the under cover. Hence, the surface pressure applied to the contact portion therebetween is suppressed to be small, resulting in an enhancement in durability of the clamp.

According to the invention according to the fourth aspect, the pipe is fitted into the fitting groove that is formed along the front-back direction of the vehicle on the upper surface of the clamp. Hence, the pipe is reliably held and fixed by the clamp. Further, the opening groove of the clamp is not opened in the periphery of the cutout of the under cover. Hence, a large gap is not caused in the periphery of the cutout, the invasion of foreign substances into the under cover and the occurrence of a strange sound can be prevented, and the aerodynamic performance of the vehicle can be enhanced.

DETAILED DESCRIPTION

Hereinafter, an embodiment of the present invention is described with reference to the attached drawings.

Figure 1:
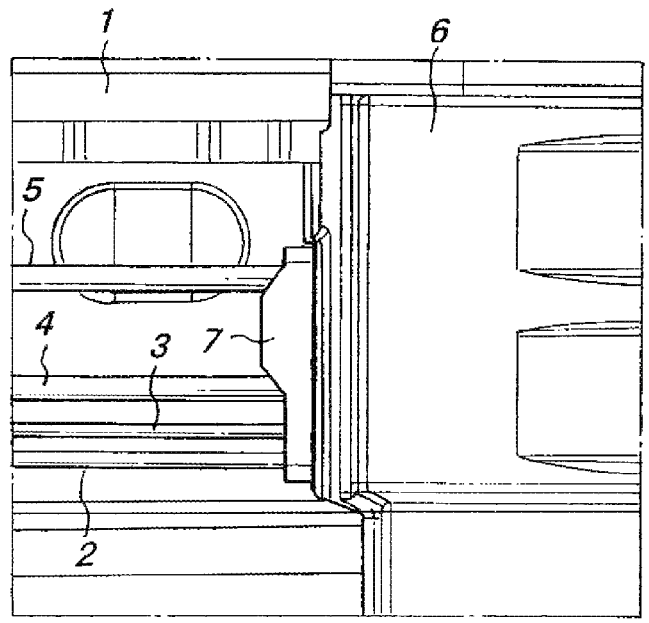
FIG. 1 is a partial bottom surface view of a vehicle, the view illustrating a pipe fixing part structure according to the present invention.
Figure 2:
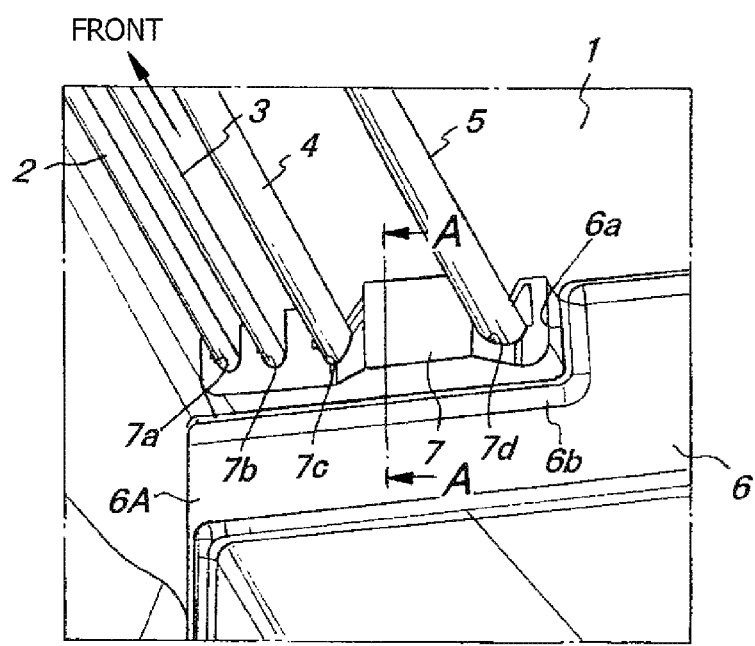
FIG. 2 is a partial perspective view of a cutout part of an under cover of the vehicle, the view illustrating the pipe fixing part structure according to the present invention.
Figure 3:
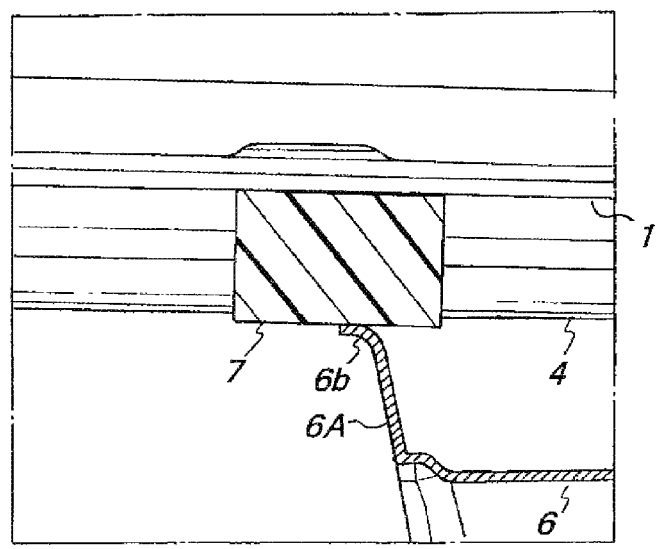
FIG. 3 is a cross-sectional view taken along a line A-A in FIG. 2.
Figure 4:
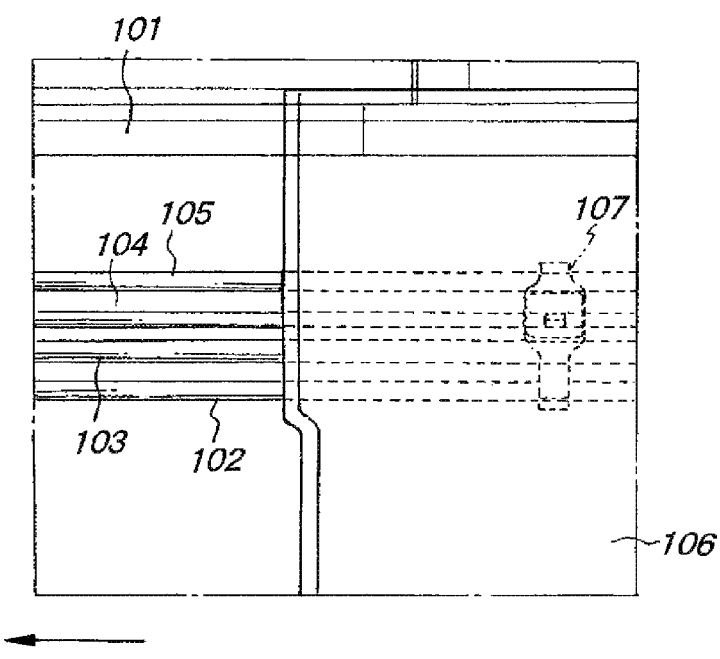
FIG. 4 is a partial bottom surface view of a vehicle, the view illustrating a conventional pipe fixing part structure.
Figure 5:
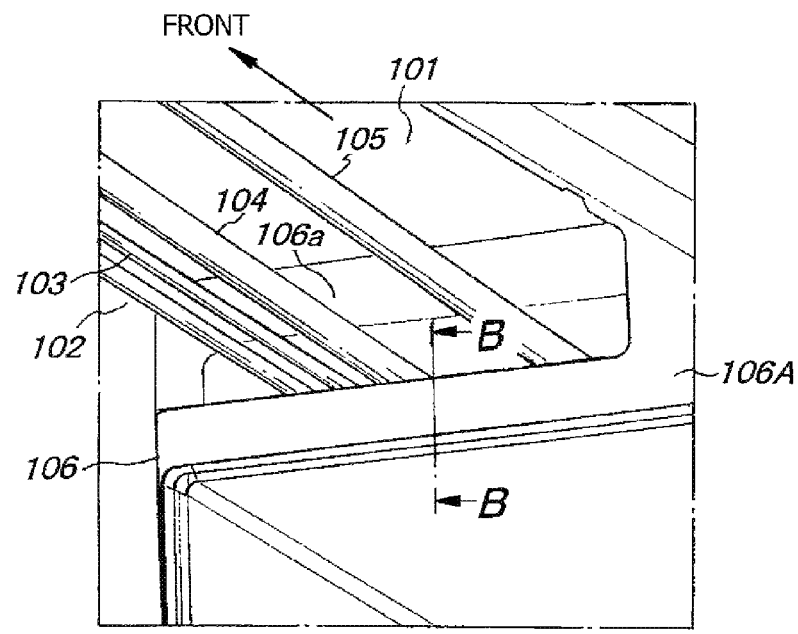
FIG. 5 is a partial perspective view of an opening part of an under cover of the vehicle, the view illustrating the conventional pipe fixing part structure.
Figure 6:
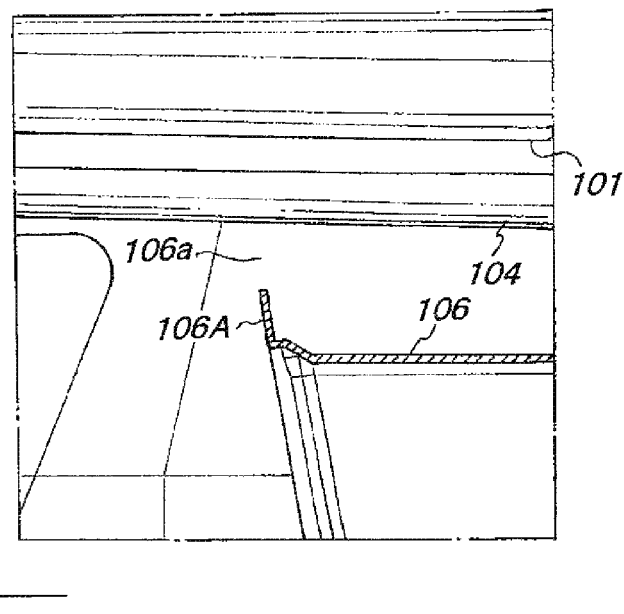
FIG. 6 is a cross-sectional view taken along a line B-B in FIG. 5.

FIG. 1 is a partial bottom surface view of a vehicle, the view illustrating a pipe fixing part structure according to the present invention. FIG. 2 is a partial perspective view of a cutout of an under cover of the vehicle. FIG. 3 is a cross-sectional view taken along a line A-A in FIG. 2. As illustrated in the drawings, a plurality of (four in the example illustrated in the drawings) pipes 2, 3, 4, and 5 are provided along the front-back direction of the vehicle (the left-right direction in FIG. 1 and FIG. 3) on the bottom surface of a floor panel 1 of the vehicle. Specifically, a floor side member is placed along the front-back direction of the vehicle on each of the right and left sides of the bottom surface of the floor panel 1 of the vehicle. The pipes 2, 3, 4, and 5 are placed along the front-back direction of the vehicle in a corner portion defined by the floor side member and the floor panel 1, the corner portion being located: on the vehicle-center lateral side of the side surface on the vehicle center side of the floor side member; and on the lower side of the bottom surface of the floor panel 1.

Further, part (right and left side portions) of the bottom surface of the floor panel 1 is covered by the under cover 6 (only one side is illustrated). A vertical wall 6A is vertically provided so as to extend upward from the front end edge of the under cover 6 to the bottom surface of the floor panel 1. Then, a rectangular cutout 6a is formed in a portion of the vertical wall 6A, the portion corresponding to the corner portion defined by the floor side member and the floor panel 1. As illustrated in FIG. 3, a horizontal flange 6b that is substantially orthogonally bent from the vertical wall 6A to the vehicle front side (the left side in FIG. 3) is formed in the periphery of the cutout 6a. Note that the under cover 6 is made of resin or metal.

In the present embodiment, a clamp 7 that is shaped into a rectangular block using resin is placed in the cutout 6a of the under cover 6. As illustrated in FIG. 3, the clamp 7 is placed across the cutout 6a of the under cover 6 so as to extend on both the front and back sides of the cutout 6a of the under cover 6. The clamp 7 includes: a portion that is located on the vehicle front side of the vertical wall 6A and is not covered by the under cover 6; a portion that is located on the upper side of the vertical wall 6A and abuts against the flange 6b of the under cover 6; and a portion that is located on the vehicle back side of the vertical wall 6A and is covered by the under cover 6. Then, as illustrated in FIG. 2, on the upper surface of the clamp 7, four (as many as the number of the pipes 2 to 5) slit-like fitting grooves 7a, 7b, 7c, and 7d are provided in the front-back direction at appropriate horizontal intervals (arrangement intervals of the pipes 2 to 5) so as to penetrate through the clamp 7. The four pipes 2 to 5 are respectively fitted into and held by the fitting grooves 7a to 7d. That is, the fitting grooves 7a to 7d into which the pipes 2 to 5 are respectively fitted to be held thereby are opened only on the upper surface of the clamp 7, and respectively surround the right, left, and lower portions of the pipes. Note that the clamp 7 is fixed to the bottom surface of the floor panel 1 by a fixing structure (not illustrated).

Here, as illustrated in FIG. 3, the cutout 6a of the under cover 6 is formed into a shape along the outer shape of the clamp 7, and the flange 6b is formed along the outer surface of the clamp 7, in the periphery of the cutout 6a. The outer surface of the clamp 7 is received by the flange 6b, and the two are in surface contact with each other. Specifically, flanges continuously formed in the periphery of the cutout 6a include: a flange that is bent at an upper end edge of the vertical wall 6A at which the cutout 6a is not formed, abuts against the bottom surface of the floor panel 1, and extends toward the front along the bottom surface thereof; a flange that is formed continuously with this flange, is bent at a lateral end edge of the vertical wall 6A corresponding to a portion of the cutout 6a, abuts against the side surface of the clamp 7, and extends toward the front along the side surface thereof; the flange 6b that is formed continuously with this flange, is bent at an upper end edge of the vertical wall 6A corresponding to a portion of the cutout 6a, abuts against the bottom surface of the clamp 7, and extends toward the front along the bottom surface thereof; and a flange that is formed continuously with this flange, is bent at a lateral end edge of the vertical wall 6A corresponding to a portion below the cutout 6a, abuts against the side surface on the vehicle center side of the floor side member, and extends toward the front along the side surface thereof. (See FIG. 3)

As described above, in the present embodiment, the four pipes 2 to 5 are placed in the space between the floor panel 1 and the under cover 6, are arranged through a portion of the vertical wall 6A of the under cover 6, and reach the outside of the under cover 6. Further, the four pipes 2 to 5 are held by the clamp 7 placed in the cutout 6a formed in the vertical wall 6A at the front end of the under cover 6. With this configuration, the clamp 7 prevents the pipes 2 to 5 from coming into contact with the periphery of the cutout 6a formed in the under cover 6. As a result, without the use of a protective member such as a protector, the pipes 2 to 5 are protected and prevented from being damaged. Particularly in the present embodiment, the pipes 2 to 5 are respectively fitted into the four fitting grooves 7a to 7d that are formed along the front-back direction of the vehicle on the upper surface of the clamp 7. With this configuration, after attachment to the vehicle, the pipes 2 to 5 are reliably held and fixed by the clamp 7 due to the fact that the respective openings above the fitting grooves 7a to 7d are closed by the floor panel 1 and to their own weights of the pipes 2 to 5. In this case, the fitting grooves 7a to 7d of the clamp 7 respectively surround the right, left, and lower portions of the pipes without being opened in the periphery of the cutout 6a of the under cover 6. Hence, a large gap is not caused in the periphery of the cutout 6a, and the invasion of foreign substances into the under cover 6 and the occurrence of a strange sound can be prevented. Moreover, the aerodynamic performance of the vehicle can be enhanced.

Further, in the present embodiment, the clamp 7 is in surface contact with the flange 6b formed in the periphery of the cutout 6a of the under cover 6. With this configuration, the attachment position of the under cover 6 can be determined by the clamp 7. Moreover, the surface pressure applied to the contact portion therebetween is suppressed to be small, and hence the clamp 7 is prevented from being damaged, resulting in an enhancement in durability of the clamp 7. Then, in the present embodiment, the clamp 7 is placed across the cutout 6a of the under cover 6 so as to extend on both the front and back sides of the cutout 6a of the under cover 6. Hence, portions of the pipes 2 to 5 are covered by the clamp 7, the portions being located on the vehicle front side of the vertical wall 6A and on the vehicle back side of the vertical wall 6A and being adjacent to the vertical wall 6A. Then, the clamp reliably prevents the pipes 2 to 5 from coming into contact with the periphery of the cutout 6a of the under cover 6, and the pipes 2 to 5 are effectively protected.

Furthermore, the cutout 6a of the under cover 6 is closed by the clamp 7. With this configuration, the invasion of foreign substances into the under cover 6 (into the space between the floor panel 1 and the under cover 6) and the occurrence of a strange sound caused by such invading foreign substances can be prevented, and the aerodynamic performance of the vehicle can be enhanced. Particularly in the present embodiment, the cutout 6a of the under cover 6 is formed into a shape along the outer shape of the clamp 7, and the flange 6b is formed along the outer surface of the clamp 7, in the periphery of the cutout 6a. With this configuration, a gap between the cutout 6a of the under cover 6 and the clamp 7 is minimized, the invasion of foreign substances into the under cover 6 and the occurrence of a strange sound can be reliably prevented, and the aerodynamic performance of the vehicle can be further enhanced.

The invention claimed is:

1. A pipe fixing part structure for a pipe placed in a front-back direction of a vehicle, comprising:
    an under cover having a vertical wall and a horizontal flange, the horizontal flange covering a portion of a bottom surface of a floor panel;
    a clamp that holds the pipe between the under cover and the floor panel and is fixed to a bottom surface of the floor panel; and
    a cutout that is formed at at least a front end edge of the under cover;
    wherein the clamp is placed in the cutout and across the cutout of the under cover so as to extend on both front and back sides of the cutout of the under cover.

2. The pipe fixing part structure according to claim 1, wherein
    the cutout of the under cover is formed into a shape along an outer shape of the clamp; and
    a flange is formed along an outer surface of the clamp in a periphery of the cutout.

3. The pipe fixing part structure according to claim 1, wherein
    the cutout of the under cover is formed into a shape along an outer shape of the clamp; and
    a flange is formed along an outer surface of the clamp in a periphery of the cutout.

4. The pipe fixing part structure according to claim 1, wherein
    a fitting groove is formed along the front-back direction of the vehicle on an upper surface of the clamp; and
    the pipe is fitted into the fitting groove.

5. The pipe fixing part structure according to claim 1, wherein
    a fitting groove is formed along the front-back direction of the vehicle on an upper surface of the clamp; and
    the pipe is fitted into the fitting groove.

6. The pipe fixing part structure according to claim 2, wherein
    a fitting groove is formed along the front-back direction of the vehicle on an upper surface of the clamp; and
    the pipe is fitted into the fitting groove.

7. The pipe fixing part structure according to claim 1, wherein the clamp is positioned such that portions of the clamp extend on either side of the vertical wall.

8. The pipe fixing part structure according to claim 1, wherein the clamp is positioned such that portions of the clamp extend overlap with the horizontal flange.

* * * * *